Aug. 6, 1968    R. H. BLACK    3,395,743
LOCK WASHER
Filed Feb. 1, 1967    2 Sheets-Sheet 2
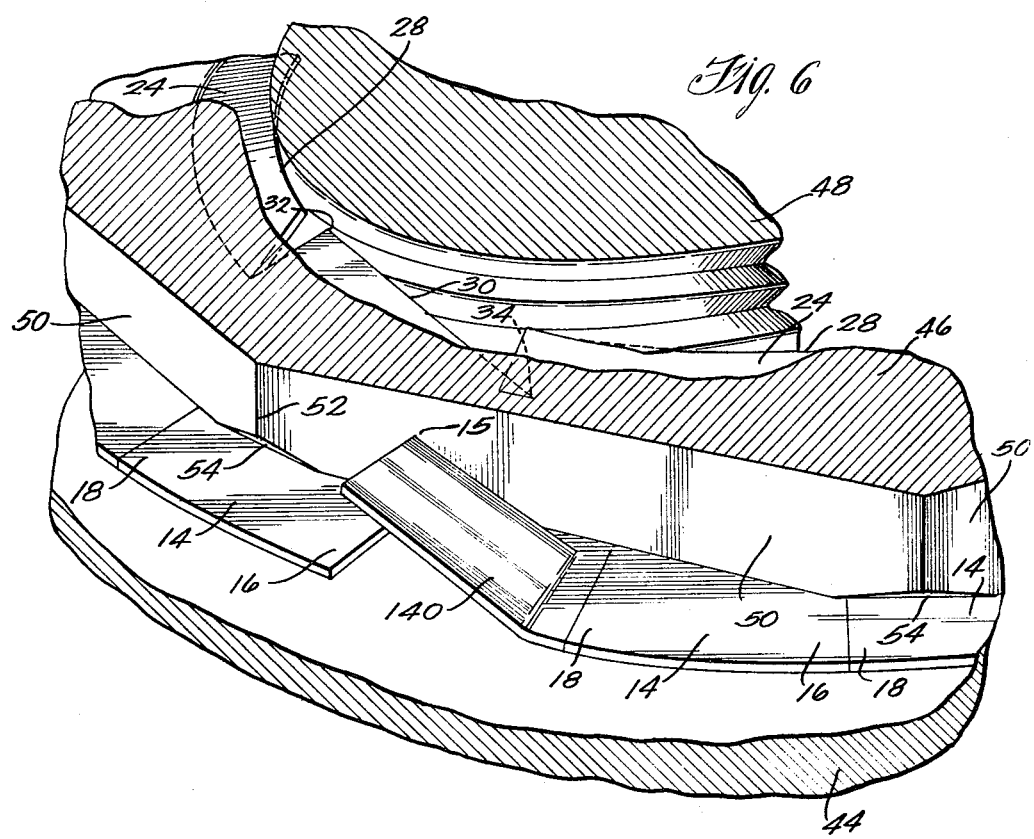
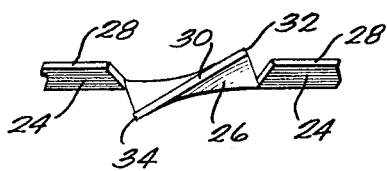
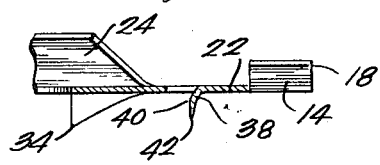
Inventor
Robert H. Black
By Wheeler, Wheeler, House & Clemency
Attorneys United States Patent Office
3,395,743
Patented Aug. 6, 1968

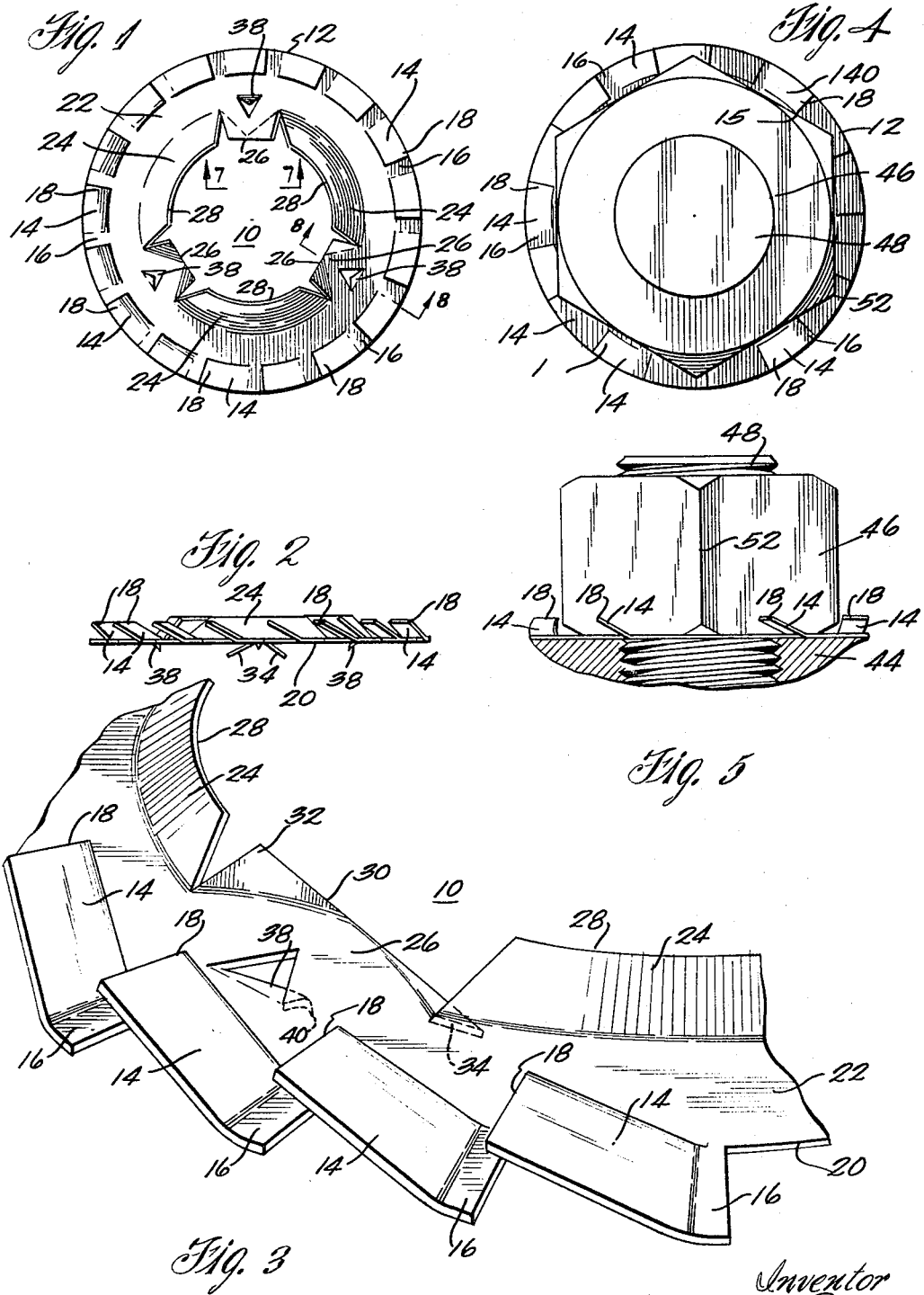

3,395,743
LOCK WASHER
Robert H. Black, 1005 Madera Circle,
Elm Grove, Wis. 53122
Filed Feb. 1, 1967, Ser. No. 613,320
3 Claims. (Cl. 151—30)

ABSTRACT OF THE DISCLOSURE

An annulus of thin resilient stock is provided about its external periphery with obliquely elevated tabs with inner corners located for successively engaging the flat surfaces of a nut. The inner periphery comprises initially elevated arcuate sectors alternating with guide flanges, the latter being twisted to ride across the bolt threads to guide the washer during its application to a bolt. Under pressure of a nut, the elevated flanges are flattened and thereby clampingly engaged with the bolt, and prongs projecting downwardly from the washer engage the work.

Background of the invention

Ordinary commercial lock washers are relatively heavy and they normally prevent or oppose relative rotation between only two of the members which they engage. Insofar as conventional lock washers are at all positive in locking a nut against rotation, they are destroyed in application or removal so that they are not re-usable. The lock washer of the present invention is not only relatively positive but is re-usable. Its effectiveness is a function of its design rather than its mass. Accordingly, very light spring steel stock is used.

While the washer of the present invention costs slightly more to fabricate, it uses only one-eighth as much steel as a typical conventional washer; the material costs less than a quarter as much as the material for a like number of conventional washers; and the shipping cost is about one-eighth that of a conventional washer. While the overall expense is therefore materially reduced, the effectiveness is increased.

It will be found that washers superficially resembling the washer of the present invention do not have the same advantages. The closest references currently known to me are patents to Rich, No. 1,267,695; Guiducci, No. 2,124,-249; Olson, No. 2,228,284; and Poupitch, No. 2,424,208.

Summary of the invention

The washer of the present invention maintains a rotation-resisting connection between all three members which it engages, namely, the workpiece, the bolt and the nut. While resilient tabs on the periphery of the washer successively spring up to engage the facets of the nut, and spring prongs are forced downwardly to penetrate the workpiece, the bolt (whether threaded or not) is engaged by the margins of initially elevated sector-shaped flanges. As these are flattened by the nut, they are reduced in radius to bite into the threads of the bolt, thus completing a three-way connection of the washer to the nut, the bolt, and the workpiece to preclude relative rotation.

It is also a feature of the invention that despite the thinness of the sector flanges, these do not enter the threads of the bolt during the application of the washer to the bolt, penetration of the flanges into the threads being prevented by twisted guide flanges which serve as spacers and ride across the bolt threads during placement.

Brief description of the drawings

FIG. 1 is a plan view of a washer embodying the invention.

FIG. 2 is a side elevational view of the washer.

FIG. 3 is an enlarged fragmentary detail view in perspective.

FIG. 4 is a plan view of a simple nut bolt and lock washer.

FIG. 5 is a view in side elevation.

FIG. 6 is a fragmentary detail view in perspective taken on a section through the nut and bolt and workpiece to show the functioning of the washer.

FIG. 7 is a detail view on an enlarged scale looking at the inner periphery of the washer embodying the invention as viewed from the line 7—7 of FIG. 1.

FIG. 8 is a detail view on an enlarged scale taken in cross section on the line 8—8 of FIG. 1.

Detailed description of the invention

For the purpose of exemplifying the invention, I am describing herein the construction of a lock washer applicable to a one-half inch bolt, it being understood that all particulars given are by way of example and not by way of limitation. For other sizes, the various dimensions would be changed appropriately.

The stock used is thin as compared with commercial lock washers. For a one-half inch lock washer, I prefer to use C-1064 fine grained spring steel stock of a thickness of .010–.015 inch.

In accordance with conventional practice, the lock washer is annular having a central opening 10. Its external periphery 12 has a diameter of approximately .930.

The portion of the washer adjacent the periphery 12 comprises an uneven number of arcuately extending upwardly inclined resilient tabs 14 for engaging the facets of a nut or bolt head. In the instant exemplification, there are 17 such tabs, equally spaced and bent upwardly that approximately 45 degrees.

An undeflected portion 16 of the washer intervenes between the elevated end 18 of each tab and the base 20 on the next. As shown, the length of each of the 17 tabs is approximately .112″ and the intervening space is approximately .060″. The number of tabs and the dimensions are particularly chosen for use with a one-half inch nut of three-quarter inch hex contour. As will be explained, only one of the tabs 14 will be engaged at any one time with one of the faces of a hex nut to resist counterrotation thereof.

Immediately within the peripheral series of locking tabs 14, the washer has a generally planiform area at 22.

The central opening 10 of the completed washer has a diameter of approximately .505″, to be receivable freely over a one-half inch bolt, whether the bolt be threaded or unthreaded, and whether the threads are right or left hand. In the instant embodiment, the central opening 10 is bounded by three guide sectors or flanges 24 alternating with short twisted flanges 26. The upward inclination of the resiliently yieldable flanges 24 from the generally planiform area 22 is approximately 50 degrees maximum and the height of their respective margins 28 above the planiform portions 22 is approximately .055″.

It will be noted that each of the guide flanges 26 is centered directly opposite the midpoint of a flange sector 24. Whereas the margin 28 of each sector 24 is an arc, the margin 30 of each of the guide flanges 26 is rectilinear, being tangent to an imaginary circle of the same radius as the elevated margins 28 of flange sectors 24. The total vertical distance between the high corner 32 and the low corner 34 of each guide flange 26 is approximately .090″ minimum. The horizontal width of the respective guide flanges is typically .187″.

Whereas the flange sectors 24 lock to the bolt when the washer is compressed, the guide flanges 26 do not. It is their purpose to guide the washer in its movement axially of the bolt toward the position which the washer will occupy in use. In effect, the straight edge margins 30 are calculated to ride across the threads of a threaded bolt and to hold the sector flanges 24 normally free of the threads so that the washer will drop into position in a manner which would not be possible if the margins 28 of the sectors 24 could catch in the bolt thread. But for the twist flanges, the sectors 24 could readily catch in the bolt threads because the washer is so thin. As constructed, the washer, despite its being so thin, is as easily applicable over the bolt as would be the case with a conventional washer of substantial thickness. While these twisted flanges have the further advantages of digging into the workpiece and the nut as the nut is tightened, nevertheless their principal function is guidance during assembly.

Behind each of the guide flanges 26 a triangular tongue 38 is formed downwardly at an angle of approximately 60 degrees, its apex 40 being further bent downwardly at 42 to stand at approximately 90 degrees to the plane of the flat area 22 of the washer. Because of the two angles, the points will embed themselves materially in all but the hardest workpiece surfaces. Due to resilience of the stock, the prongs will spring back to some extent toward their original positions when nut pressure is relieved. Thus the washer is re-usable in this, as in other respects.

As already stated, the dimensions of the opening 10 in the center of the washer freely receive a one-half inch bolt or the like because the margins 28 of the elevated sectors 24 are on an arc of a circle having a diameter of approximately .505". However, when these sectors are flattened, under the thrust of a nut, the diameter of the central opening is reduced to .483". Consequently a bolt embraced by the nut will be clamped by the margins 28 of the sectors 24. These margins may cut into the metal of an unthreaded bolt; or across one or more of the threads of a threaded bolt. The washer material is so light that if the hardened surface of a bolt prevents penetration by these margins 28, the resilient washer may actually be forced to expand radially. In that event, of course, the bolt will be held frictionally by the resulting centripetal thrust.

The instant lock washer thus secures against relative rotation all three of the members which it contacts, namely, the nut member, the bolt member, and the work member. It is equally effective for locking cap screws, or for use under the head of a bolt.

The washer will have but one of the locking tabs 14 engaged at any one time with a face of the nut. The workpiece 44 will tend to have the washer prongs 40 materially embedded in it under pressure of a nut 46 threaded on bolt 48. The nut illustrated is a conventional hex nut having facets 50 and intervening apices 52. Beneath the corners 52, the nut has chamfers 54 in accordance with conventional practice. As the nut rotates, the corners force downwardly the successive resilient upwardly projecting tabs 14. As each successive corner passes a tab 14, the tab springs up beside one of the facets 50. The intermediate portions of the flat facets 50 between the corners 52 of the nut will normally be spaced from one of the obliquely inclined tabs 14 as clearly appears in FIG. 4. When the corners 52 of the nut ride over the tabs, they depress them, as appears in FIG. 6. There will normally be but one of the tabs which has its inner corner 15 actually in locking engagement with a facet 50 of the nut close behind one of the corners 52 which has just freed that tab to allow it to spring upwardly. The tab in question is marked 140 in FIG. 6.

Assuming that the washer has 17 tabs, as in the preferred embodiment shown, the six faces of the washer will have 102 positions in which the washer will be locked against retrograde movement. Movement of the nut from one of these 102 locking positions to another on a bolt with 13 pitch threads would only involve .00077 inch of axial nut movement upon the bolt. This movement is so slight that the elasticity of the bolt itself will assure positive engagement of the nut and the washer to resist counterrotation.

However, due to the extremely light material, and the resilience thereof, and the general design shown, the washer will permit counterrotation of the nut when sufficient force is exerted, and this result is achieved without destruction of the washer, which may therefore be reused.

I claim:

1. A washer of spring metal having a planar body portion with a central opening, a plurality of alternately spaced locking flanges and guide flanges extending radially inwardly from the inner periphery of the body portion, the locking flanges being obliquely inclined upwardly above the plane of the body portion and having arcuate inner edges, the guide flanges being generally rectangularly shaped with straight inner edges being substantially tangent to the circle defined by the arcuate edges of the locking flanges and with the inner edges being inclined in a direction opposite to that of the thread on a bolt to be used with the washer, each of the locking flanges being disposed diametrically opposite one of the guide flanges, the diameter of the circle defined by the arcuate edges of the locking flanges in their initial position being at least as great as the major diameter of the threaded shank of a bolt to be used with the washer, the locking flanges being adapted to be flattened between a faceted member and a workpiece, whereby the opening defined by the inner edges of the locking flanges is reduced to a diameter less than that of the major diameter of the bolt, and the outer periphery of the washer body having resilient means adapted to engage the sides of the faceted member for preventing rotation thereof in a direction opposite to that of the threads on the bolt.

2. A washer according to claim 1 provided between certain of the guide flanges and the resilient means on the outer periphery of the washer with tongues projecting downwardly from the body portion and directed generally radially toward the center of the washer.

3. A washer according to claim 2 in which each of said tongues is generally triangular in form and has a pointed apex extending more sharply downwardly than the rest of the tongue.

References Cited

UNITED STATES PATENTS

| | | | |
|---|---|---|---|
| 533,895 | 2/1895 | Hinds | 151—52 |
| 904,937 | 11/1908 | Clark | 151—35 |
| 1,386,092 | 8/1921 | Cole | 151—52 |
| 1,414,140 | 4/1922 | Larson | 151—52 |
| 3,209,805 | 10/1965 | Fehrmann | 151—30 |

CARL W. TOMLIN, *Primary Examiner.*

R. S. BRITTS, *Assistant Examiner.*